United States Patent
Taylor et al.

(10) Patent No.: US 10,451,085 B2
(45) Date of Patent: Oct. 22, 2019

(54) ASSEMBLY METHODS FOR THE CONNECTION OF A TURBINE WHEEL TO A SHAFT

(71) Applicant: BorgWarner Inc., Auburn Hills, MI (US)

(72) Inventors: Andrew Taylor, Mirfield (GB); Alex Milburn, Holywell Green (GB)

(73) Assignee: BorgWarner Inc., Auburn Hills, MI (US)

(*) Notice: Subject to any disclaimer, the term of this patent is extended or adjusted under 35 U.S.C. 154(b) by 188 days.

(21) Appl. No.: 15/285,761

(22) Filed: Oct. 5, 2016

(65) Prior Publication Data

US 2018/0094646 A1    Apr. 5, 2018

(51) Int. Cl.
  *F04D 29/60* (2006.01)
  *B23P 15/00* (2006.01)
  (Continued)

(52) U.S. Cl.
  CPC ........ *F04D 29/601* (2013.01); *B23K 15/0006* (2013.01); *B23K 20/122* (2013.01);
  (Continued)

(58) Field of Classification Search
  CPC .. B23K 15/00; B23K 15/0006; B23K 20/122; B23K 20/129; B23K 2201/001; F01D 5/025; F01D 5/027; F02B 37/04; F02B 37/10; F02B 39/02; F02B 39/08; F02B 39/10; F02C 6/12; F04D 29/60; F04D 29/601; F04D 29/602; F04D 29/603; F04D 29/62; F04D 29/624; F04D 29/626; F04D 29/64; F04D 29/644; F04D 29/646;
  (Continued)

(56) References Cited

U.S. PATENT DOCUMENTS 4,694,689 A * 9/1987 Kawasaki ............... G01M 1/04
                                                        73/114.77
4,963,076 A * 10/1990 Fleischmann ........... F04D 25/06
                                                         417/423.7
(Continued)

FOREIGN PATENT DOCUMENTS

DE    102011113327 A1    3/2012
EP        0212091 A1     3/1987
(Continued)

OTHER PUBLICATIONS

International Search Report and Written Opinion; dated Dec. 12, 2017; for International Application No. PCT/US2017/053381;13 pages.

*Primary Examiner* — Sarang Afzali
(74) *Attorney, Agent, or Firm* — BrooksGroup

(57) ABSTRACT

A method of assembling an electrified turbocharger comprising assembling a rotor assembly onto a shaft; balancing the shaft and rotor assembly; attaching at least one bearing onto the shaft adjacent the rotor assembly; inserting a stator assembly into a first housing component; axially inserting the shaft, the rotor assembly, and the at least one bearing into the first housing component; attaching a second housing component to the first housing component; attaching a compressor wheel to a first end of the shaft; and attaching a turbine wheel to a second end of the shaft and balancing the electrified turbocharger.

12 Claims, 2 Drawing Sheets

(51) Int. Cl.
*F02B 37/10* (2006.01)
*F02B 39/10* (2006.01)
*F04D 29/66* (2006.01)
*B23K 15/00* (2006.01)
*B23K 20/12* (2006.01)
*F01D 5/02* (2006.01)
*F02C 6/12* (2006.01)
*B23K 101/00* (2006.01)

(52) U.S. Cl.
CPC .......... *B23K 20/129* (2013.01); *B23P 15/006* (2013.01); *F01D 5/025* (2013.01); *F02B 37/10* (2013.01); *F02B 39/10* (2013.01); *F02C 6/12* (2013.01); *F04D 29/662* (2013.01); *B23K 2101/001* (2018.08); *F05D 2220/40* (2013.01); *F05D 2230/233* (2013.01); *F05D 2230/239* (2013.01); *F05D 2230/60* (2013.01); *Y02T 10/144* (2013.01); *Y10T 29/4932* (2015.01); *Y10T 29/49771* (2015.01)

(58) Field of Classification Search
CPC ...... F04D 29/66; F04D 29/661; F04D 29/662; F04D 29/666; F04D 29/668; F05D 2220/40; F05D 2230/233; F05D 2230/239; F05D 2230/60; G01M 1/14; G01M 1/24; G01M 1/28; G01M 1/30; G01M 1/32; G01M 1/323; G01M 1/34; H02K 15/16; H02K 15/165; B23P 15/006; Y10T 29/49764; Y10T 29/49771; Y10T 29/49774
USPC .... 29/888.01, 888.011, 888.012, 889, 889.2, 29/889.21, 889.22, 889.3, 889.4, 407.01, 29/407.05, 407.07; 60/605.1; 123/559.1, 123/559.2, 559.3, 560–566; 417/410.1, 417/423.1, 423.7, 423.12
See application file for complete search history.

(56) References Cited

U.S. PATENT DOCUMENTS

| | | | | |
|---|---|---|---|---|
| 6,449,950 | B1* | 9/2002 | Allen | F01D 25/166 60/607 |
| 6,561,336 | B1* | 5/2003 | Huart | F02B 63/04 192/70.25 |
| 8,342,382 | B2* | 1/2013 | Baxter | B23K 20/121 228/103 |
| 9,044,833 | B2* | 6/2015 | Holzschuh | B23P 15/006 |
| 2003/0012672 | A1* | 1/2003 | Sowa | F04C 18/0207 418/151 |
| 2005/0123417 | A1* | 6/2005 | DelVecchio | F01D 5/025 417/407 |
| 2005/0193713 | A1* | 9/2005 | Kovasity | F01D 15/00 60/39.08 |
| 2008/0232962 | A1* | 9/2008 | Agrawal | F04D 25/082 415/214.1 |
| 2009/0025386 | A1* | 1/2009 | Rumsby | F02B 37/10 60/607 |
| 2010/0061851 | A1* | 3/2010 | Hummel | F01D 25/16 415/229 |
| 2014/0147306 | A1* | 5/2014 | Yamashita | F02B 37/10 417/410.1 |
| 2014/0373532 | A1* | 12/2014 | Diemer | F04D 13/06 60/607 |
| 2015/0322958 | A1* | 11/2015 | Date | F04D 29/056 415/208.1 |
| 2016/0076556 | A1* | 3/2016 | Zollinger | F04D 29/626 60/605.1 |
| 2016/0184930 | A1* | 6/2016 | Murata | B23K 26/24 416/223 A |

FOREIGN PATENT DOCUMENTS

| | | |
|---|---|---|
| EP | 2719875 A1 | 4/2014 |
| EP | 2719877 A1 | 4/2014 |
| EP | 2730744 A1 | 5/2014 |

\* cited by examiner

ASSEMBLY METHODS FOR THE CONNECTION OF A TURBINE WHEEL TO A SHAFT

TECHNICAL FIELD

The field to which the disclosure generally relates to includes turbochargers.

BACKGROUND

An engine breathing system may include a turbocharger.

SUMMARY OF ILLUSTRATIVE VARIATIONS

A number of variations may include a method of assembling an electrified turbocharger comprising: assembling a rotor assembly onto a shaft; testing the rotating balance of the rotor assembly; attaching at least one bearing onto the shaft adjacent the rotor assembly; inserting a stator assembly into a first housing component; axially inserting the shaft, the rotor assembly, and the at least one bearing into the first housing component; attaching a second housing component to the first housing component; attaching a compressor wheel to a first end of the shaft and attaching a turbine wheel to a second end of the shaft; and testing the rotating balance of the electrified turbocharger.

A number of variations may include a method of assembly comprising: assembling a turbocharger core comprising assembling a rotor assembly onto a shaft; attaching at least one bearing onto the shaft adjacent the rotor assembly; inserting a stator assembly into a first housing component; axially inserting the shaft, the rotor assembly, and the at least one bearing into the first housing component; attaching a second housing component to the first housing component; and attaching a turbine wheel and a compressor wheel to the shaft of the turbocharger core to form a turbocharger assembly.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
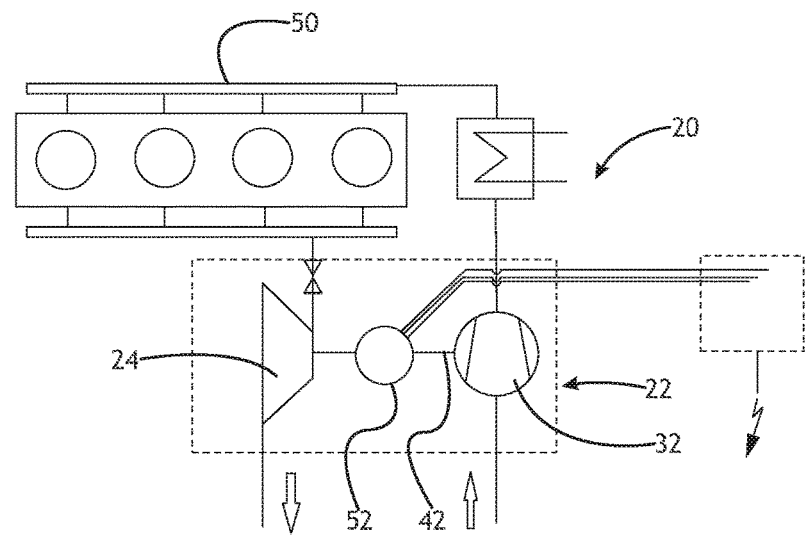
FIG. 1 illustrates a schematic of an engine breathing system according to a number of variations.
Figure 2:
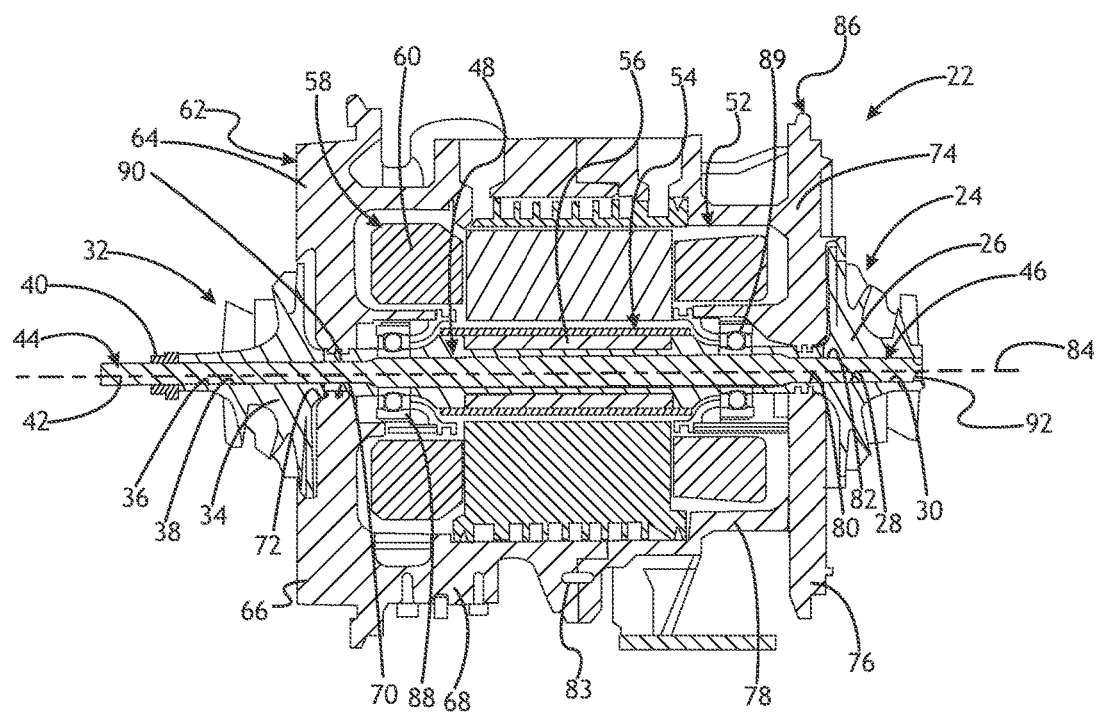
FIG. 2 illustrates an electrified turbocharger according to a number of variations.

Referring to FIG. 1, in a number of variations, an engine breathing system 20 may include a turbocharger 22 including, but not limited to, an electrified turbocharger. In a number of variations, an electrified turbocharger 22 may include a turbine 24 having a turbine wheel 26 (a variation of which is illustrated in FIG. 2) which may be operatively attached to a compressor 32 having a compressor wheel 34 (a variation of which is illustrated in FIG. 2) via a shaft 42. In a number of variations, the shaft 42 may be supported by one or more bearings 88, 89. The turbine wheel 26 may be driven by exhaust gas fluid-flow which may cause the shaft 42 to rotate which may then drive the compressor wheel 34. The compressor wheel 34 may then pressurize air which may enter the internal combustion engine 50. In a number of variations, an electric motor 52 may be operatively attached to the shaft 42 and may selectively drive the shaft 42. A split center housing assembly 62 (a variation of which is illustrated in FIG. 2) may surround at least a portion of the electrified turbocharger 22. The split center housing assembly 62 may comprise a first bearing housing component 64 and a second bearing housing component 74.

Referring to FIG. 2, in a number of variations, an electric motor 52 may comprise a rotor assembly 54 which may be driven by a stator assembly 58. The rotor assembly 54 may be operatively coupled to the shaft 42 and may selectively drive the shaft 42. In a number of variations, the stator assembly 58 may operate as an electromagnet which may be energized by field windings 60. The rotor assembly 54 may be rotated by the stator assembly 58 by the interaction between the field windings 60 and magnetic fields in the rotor assembly 54 which may produce a torque about an axis of rotation 84 of the shaft 42. In a number of variations, one or more permanent magnets 56 may be used to provide the magnetic field in the rotor assembly 54.

Figure 3:
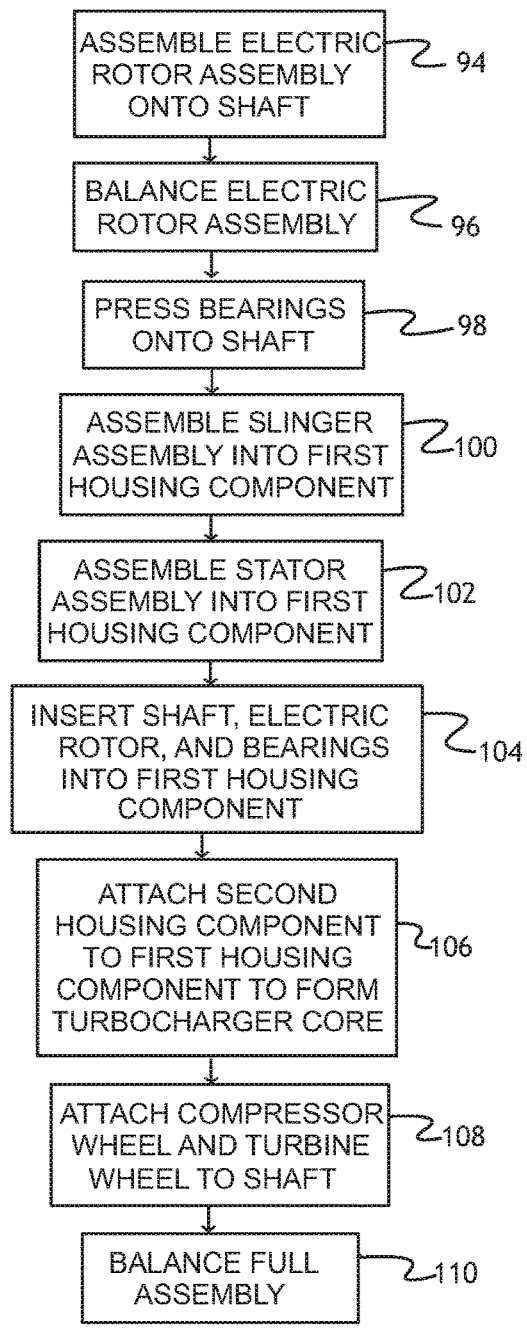
FIG. 3 illustrates a flow chart of a method of assembly of an electrified turbocharger according to a number of variations.

Referring to FIGS. 2-3, in a number of variations, a turbocharger 22 may be assembled together so that the turbine wheel 26 and the compressor wheel 34 may be attached as a final step 110 of assembly which may allow for the rotor assembly 54 and/or the bearings 88, 89 to be fitted onto either end of the shaft 42. Attaching the turbine wheel 26 at the final step 110 of assembly of the turbocharger 22 may also allow for the diameter of the shaft 42 to be increased adjacent the rotor assembly 54 which may increase the stiffness of the shaft 42 which may improve the natural frequency of the rotor assembly 54 with or without electrical assist. Pre-assembling the turbocharger core 86 separate than the turbine wheel 26 and the compressor wheel 34 may also allow for manufacturing flexibility with the use of pre-assembled turbocharger cores 86 which may be independent of the turbine wheel 26 and the compressor wheel 34 geometry. The above assembly method may also improve manufacturing and ease of assembly.

In a number of variations, a first step 94 of assembly may comprise assembling the rotor assembly 54 onto the shaft 42. In a number of variations, the shaft 42 may include a first end portion 44, a second end portion 46, and a third middle portion 48 extending therebetween. The first end portion 44 may have a first diameter and may be constructed and arranged to attach to the compressor wheel 34 and the second end portion 46 may have a second diameter and may be constructed and arranged to attach to the turbine wheel 26. The third middle portion 48 may have a third diameter and may be constructed and arranged to accommodate a first bearing 88 and a second bearing 89 and the rotor assembly 54. The third diameter of the third middle portion 48 may be greater than each of the first end portion 44 and the second end portion 46 to provide increased stiffness to the shaft 42 adjacent the rotor assembly 54 which may improve the natural frequency of the rotor assembly 54. In a number of variations, a sleeve (not illustrated) may also be used to increase the thickness of the shaft 42 adjacent the rotor assembly 54. The rotor assembly 54 may then be axially pressed onto the shaft 42. The term "axial" as used hereafter refers to a direction along or parallel to the axis of rotation 84 of the shaft 42 and the term "radial" used hereafter refers to a direction which extends from or is perpendicular to the axis of rotation 84 of the shaft 42.

In a number of variations, a second step 96 of assembly may comprise testing of the rotating balance of the rotor assembly 54. During the rotating balance test, the balance of the rotor assembly 54 may be adjusted by radially cutting a portion of the rotor assembly 54 or adding material to the rotor assembly 54. In a number of variations, balancing the rotor assembly 54 before the turbine wheel 26 and the compressor wheel 34 may be assembled onto the turbocharger 22 may improve balance mitigation.

In a number of variations, a third step 98 of assembly may include attaching a first bearing 88 onto the shaft 42 adjacent a first side of the rotor assembly 54 and attaching a second bearing 89 onto the shaft 42 adjacent a second side of the rotor assembly 54. Any number of variations of bearings 88, 89 may be used including, but not limited to, roller element bearings.

In a number of variations, a fourth step 100 of assembly may include inserting a slinger assembly 90 into a first bearing housing component 64. The first bearing housing component 64 may include an end surface 66 and a wall 68 which may extend axially outward from the end face 66. A through bore 70 defined by an inner surface 72 of the end face 66 may extend through the end face 66 and may be constructed and arranged to accommodate a portion of the shaft 42 and the slinger assembly 90. The slinger assembly 90 may also be fitted within the wall 68 of the first bearing housing component 64. Any number of variations of slinger assemblies 90 known in the art may be used.

In a number of variations, a fifth step 102 of assembly may include inserting a stator assembly 58 into the first bearing housing component 64. Any number of variations of stator assemblies 58 known in the art may be used.

In a number of variations, a sixth step 104 of assembly may comprise axially inserting the shaft 42, rotor assembly 54, and the first and second bearings 88, 89 into the first bearing housing component 64 so that the first end portion 44 of the shaft 42 may extend through the through bore 70 in the end face 66 of the first bearing housing component 64.

In a number of variations, a seventh step 106 of assembly may comprise attaching a second bearing housing component 74 to the first bearing housing component 64 to form a turbocharger core assembly 86. The second bearing housing component 74 may include an end face 76 and a wall 78 which may extend axially outward from the end face 76. A through bore 80 defined by an inner surface 82 of the end face 76 may extend through the end face 76 and may be constructed and arranged to accommodate a portion of the shaft 42 and the slinger assembly 90. In a number of variations, the slinger assembly 90 may also be fit within the wall 78 of the second bearing housing component 74. In a number of variations, one or more mechanical fasteners 83 may be used to attach the first bearing housing component 64 to the second bearing housing component 74.

In a number of variations, an eighth step 108 of assembly may comprise attaching the compressor wheel 34 and the turbine wheel 26 to opposing ends of the shaft 42 of the turbocharger core 86. In a number of variations, the compressor wheel 34 may include a through bore 36 defined by an inner surface 38 of the compressor wheel 34 constructed and arranged to accommodate the first end portion 44 of the shaft 42. The compressor wheel 34 may be axially pressed onto the first end portion 44 of the shaft 42 so that a portion of the compressor wheel 34 extends within the through bore 70 in the end face 66 of the first bearing housing component 64. The compressor wheel 34 may then be axially clamped onto the shaft 42 with a compressor nut 40. In a number of variations, the turbine wheel 26 may include a through bore 28 defined by an inner surface 30 of the turbine wheel 26 constructed and arranged to accommodate the second end portion 46 of the shaft 42. The turbine wheel 26 may be axially pressed onto the second end portion 46 of the shaft 42 so that a portion of the turbine wheel 26 extends within the through bore 80 in the end face 76 of the second bearing housing component 74. The turbine wheel 26 may then be attached to the second end portion 46 of the shaft 42. The turbine wheel 26 may be attached to the second end portion 46 of the shaft 42 in any number of variations including, but not limited to, welding 92 which may prevent slippage of the turbine wheel 26. Any number of welding processes may be used including, but not limited to, electronic beam welding or friction stir welding.

In a number of variations, a ninth step 110 of assembly may comprise testing/balancing of the full turbocharger assembly 22. During the rotating balance test, material may be added or removed from the shaft 42 to balance the turbocharger assembly 22.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a method of assembling an electrified turbocharger comprising: assembling a rotor assembly onto a shaft; testing the rotating balance of the shaft and the rotor assembly; attaching at least one bearing onto the shaft adjacent the rotor assembly; inserting a stator assembly into a first housing component; axially inserting the shaft, the rotor assembly, and the at least one bearing into the first housing component; attaching a second housing component to the first housing component; attaching a compressor wheel to a first end of the shaft and attaching a turbine wheel to a second end of the shaft; and testing the rotating balance of the electrified turbocharger.

Variation 2 may include a method as set forth in Variation 1 further comprising inserting a slinger assembly into the first housing component prior to inserting the stator assembly into the first housing component.

Variation 3 may include a method of as set forth in any of Variations 1-2 further comprising adjusting the rotating balance of the rotor assembly after testing the rotating balance of the rotor assembly by at least one of radially cutting a portion of the rotor assembly or adding a material to the rotor assembly.

Variation 4 may include a method as set forth in Variation 3 further comprising adjusting the rotating balance of the turbocharger assembly after testing the rotating balance of the turbocharger assembly by at least one of adding or removing a material to the shaft.

Variation 5 may include a method as set forth in any of Variations 1-4 wherein the turbine wheel is attached to the shaft via welding.

Variation 6 may include a method as set forth in Variation 5 wherein the welding comprises electronic beam welding.

Variation 7 may include a method as set forth in Variation 5 wherein the welding comprises friction stir welding.

Variation 8 may include a method of assembly comprising: assembling a turbocharger core comprising assembling a rotor assembly onto a shaft; attaching at least one bearing onto the shaft adjacent the rotor assembly; inserting a stator assembly into a first housing component; axially inserting the shaft, the rotor assembly, and the at least one bearing into the first housing component; attaching a second housing component to the first housing component; and attaching a turbine wheel and a compressor wheel to the shaft of the turbocharger core to form a turbocharger assembly.

Variation 9 may include a method as set forth in Variation 8 further comprising balancing the shaft and the rotor assembly prior to attaching the second housing component to the first housing component.

Variation 10 may include a method as set forth in any of Variations 8-9 further comprising balancing the turbocharger assembly after attaching the turbine wheel and the compressor wheel to the turbocharger core.

Variation 11 may include a method as set forth in any of Variations 8-10 wherein attaching the turbine wheel to the turbocharger core comprises welding the turbine wheel to the shaft.

Variation 12 may include a method as set forth in Variation 11 wherein the welding comprises electronic beam welding.

Variation 13 may include a method as set forth in Variation 11 wherein the welding comprises friction stir welding.

Variation 14 may include a method as set forth in any of Variations 8-13 wherein assembling the turbocharger core further comprises inserting a slinger assembly into the first housing component prior to inserting the stator assembly into the first housing component.

Variation 15 may include a method as set forth in any of Variations 8-14 wherein the first housing component is attached to the second housing component via at least one mechanical fastener.

Variation 16 may include a method as set forth in any of Variations 8-15 wherein a first end of the shaft has a first diameter, a second end of the shaft has a second diameter, and a middle portion of the shaft has a third diameter, and wherein the third diameter is greater than the first diameter and the second diameter.

The above description of select variations within the scope of the invention is merely illustrative in nature and, thus, variations or variants thereof are not to be regarded as a departure from the spirit and scope of the invention.

What is claimed is:

1. A method of assembling an electrified turbocharger comprising: assembling a rotor assembly onto a shaft;
    testing a rotating balance of the shaft and the rotor assembly after assembling the rotor assembly onto the shaft and before further assembly of the electrified turbocharger;
    adjusting the rotating balance of the shaft and the rotor assembly after testing the rotating balance of the shaft and the rotor assembly by at least one of radially cutting a portion of the rotor assembly or adding a material to the rotor assembly;
    attaching at least one bearing onto the shaft adjacent the rotor assembly after testing the rotating balance of the shaft and the rotor assembly;
    inserting a stator assembly into a first housing component;
    axially inserting the shaft, the rotor assembly, and the at least one bearing into the first housing component after inserting the stator assembly into the first housing component;
    attaching a second housing component to the first housing component after axially inserting the shaft, the rotor assembly, and the at least one bearing into the first housing component;
    attaching a compressor wheel to a first end of the shaft and attaching a turbine wheel to a second end of the shaft after attaching the second housing component to the first housing component to form the electrified turbocharger;
    testing a rotating balance of the electrified turbocharger after attaching the second housing component to the first housing component; and
    adjusting the rotating balance of the electrified turbocharger after testing the rotating balance of the electrified turbocharger by at least one of adding or removing a material to the shaft.

2. The method of claim 1 wherein the turbine wheel is attached to the shaft via welding.

3. The method of claim 2 wherein the welding comprises electronic beam welding.

4. The method of claim 2 wherein the welding comprises friction stir welding.

5. The method of claim 1 further comprising inserting a slinger assembly into the first housing component prior to inserting the stator assembly into the first housing component.

6. A method of assembly comprising:
    assembling a turbocharger core comprising assembling a rotor assembly onto a shaft;
    attaching at least one bearing onto the shaft adjacent the rotor assembly after assembling the rotor assembly onto the shaft;
    inserting a stator assembly into a first housing component;
    axially inserting the shaft, the rotor assembly, and the at least one bearing into the first housing component after inserting the stator assembly into the first housing;
    attaching a second housing component to the first housing component after axially inserting the shaft, the rotor assembly, and the at least one bearing into the first housing component;
    testing and balancing the shaft and the rotor assembly by at least one of radially cutting a portion of the rotor assembly or adding a material to the rotor assembly prior to attaching the second housing component to the first housing component;
    attaching a turbine wheel and a compressor wheel to the shaft of the turbocharger core after attaching the second housing component to the first housing component to form an electrified turbocharger; and
    testing and balancing the electrified turbocharger by at least one of adding or removing a material to the shaft after attaching the turbine wheel and the compressor wheel to the turbocharger core.

7. The method of claim 6 wherein attaching the turbine wheel to the turbocharger core comprises welding the turbine wheel to the shaft.

8. The method of claim 7 wherein the welding comprises electronic beam welding.

9. The method of claim 7 wherein the welding comprises friction stir welding.

10. The method of claim 6 wherein assembling the turbocharger core further comprises inserting a slinger assembly into the first housing component prior to inserting the stator assembly into the first housing component.

11. The method of claim 6 wherein the first housing component is attached to the second housing component via at least one mechanical fastener.

12. The method of claim 6 wherein a first end of the shaft has a first diameter, a second end of the shaft has a second diameter, and a middle portion of the shaft has a third diameter, and wherein the third diameter is greater than the first diameter and the second diameter.

* * * * *